March 28, 1961 H. D. MAGUIRE 2,976,937
CULTIVATOR ATTACHMENT FOR TRACTORS
Filed Oct. 8, 1957 2 Sheets-Sheet 1
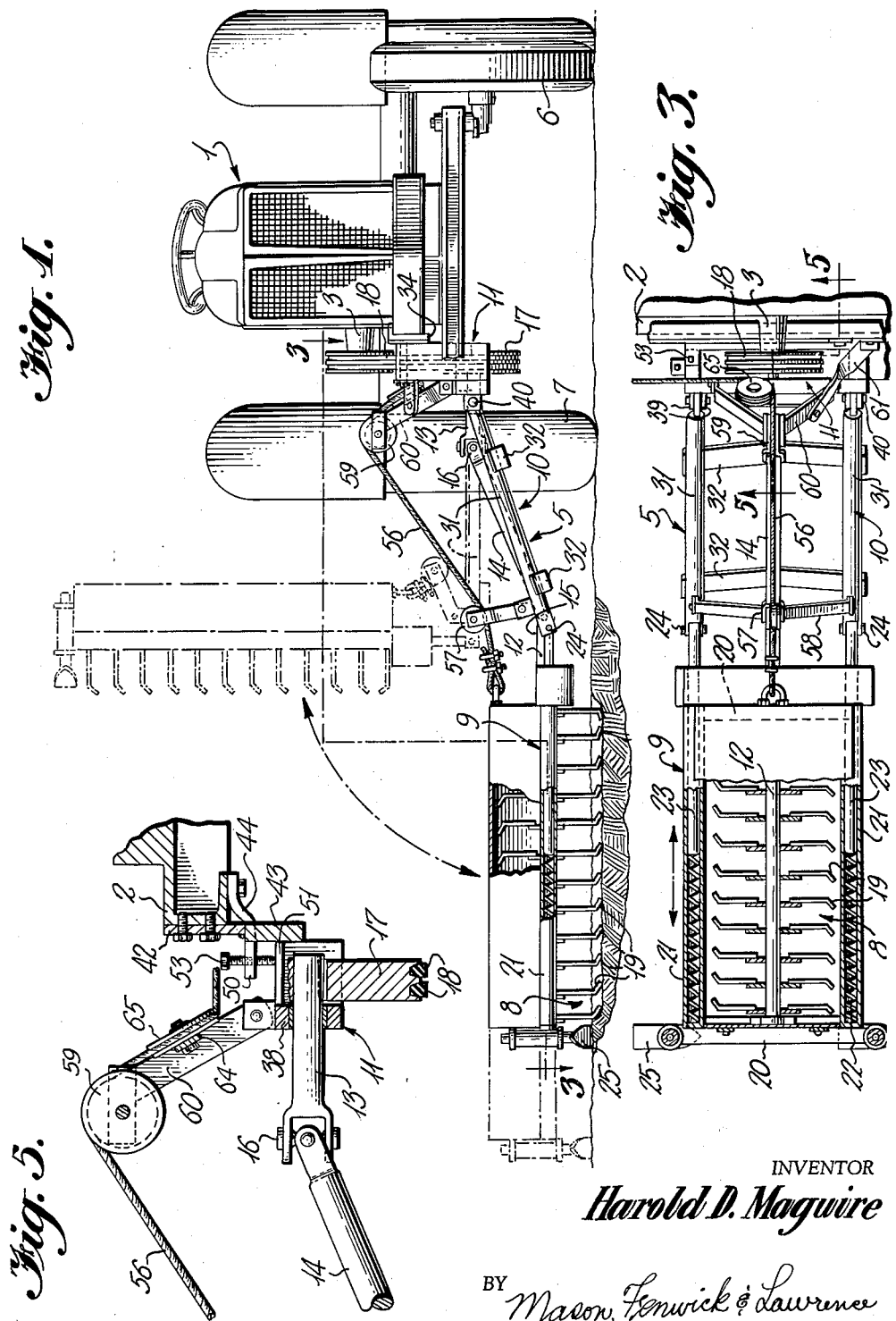
INVENTOR
Harold D. Maguire
BY Mason, Fenwick & Lawrence
ATTORNEYS

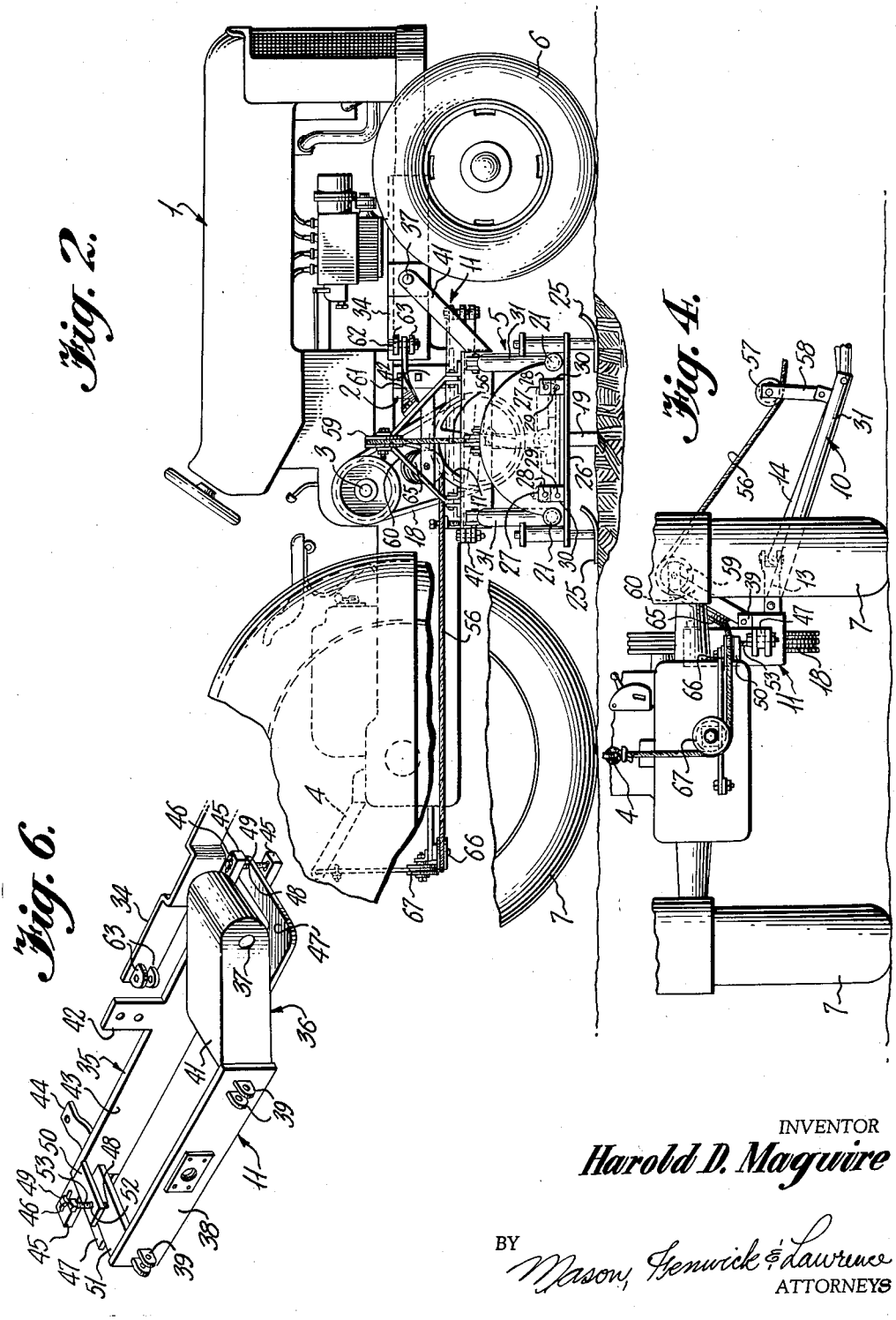

United States Patent Office 2,976,937
Patented Mar. 28, 1961

2,976,937
CULTIVATOR ATTACHMENT FOR TRACTORS

Harold D. Maguire, Orlando, Fla., assignor, by mesne assignments, to Maguire Power Implements, Inc., Ocoee, Fla., a corporation of Florida Filed Oct. 8, 1957, Ser. No. 688,951
3 Claims. (Cl. 172—98)

This invention relates to cultivating attachments for tractors, and particularly to such attachments for use in orchards and other areas where there are trees, stumps or other obstructions.

It has been a difficult problem to cultivate orchards by mechanical means, due to the fact that the carrying tractor has to be constantly maneuvered to cause the cultivators to clear the trees. This means that the tractor can never travel in a straight line and its passage across a given area is greatly slowed. Some attempts have been made to design a cultivating attachment which is retractable so that it can project from the side of the tractor and be retracted to pass around trees while the tractor maintains a straight course. The proposed devices have been cumbersome and costly.

The principal object of the present invention is to provide a cultivator which may be attached to the side of a tractor and have simple, yet positive, retracting means to permit it to move around trees without lateral movement of the tractor.

A more specific object is the provision of a retractable attachment wherein the cultivator, or other implement, is biased toward outward position.

Another object is to provide such an attachment which may be retracted and lifted to an inoperative position by standard lifting equipment.

A further object is the provision of a side attached implement having means to take power from the side power take-off of the tractor.

Yet another object is to provide an attachment of this nature wherein a belt drive from the tractor power take-off may be used, with a novel mounting for the implement to permit the implement to follow ground contour yet maintain driving tension on the drive belt.

Other objects of the invention will become apparent from the following detailed description of a practical embodiment thereof, when taken in conjunction with the drawings which accompany, and form part of, this specification.

In the drawings:

Figure 1 is a front elevation, with parts removed, of a conventional tractor with a cultivating attachment embodying the principles of the present invention connected thereto, the implement being shown in retracted position in full lines and both extended and inoperative positions in dotted lines;

Figure 2 is a side elevation of the equipment shown in Figure 1;

Figure 3 is a horizontal section taken on the line 3—3 of Figure 1;

Figure 4 is a partial rear elevation of the device showing the connection to the tractor power lift;

Figure 5 is a fragmentary vertical section on an enlarged scale taken on the line 5—5 of Figure 3; and, Figure 6 is a perspective view of the several elements which make up the mounting for the device.

In general, the invention consists of a cultivator implement mounted upon a telescopic frame attachable to the side of a tractor, with means to normally bias the frame to extended position, and means, connectible to a conventional tractor power lift, to retract the frame to draw the implement closer to the tractor and to lift it to an inoperative position. The invention also contemplates means to drive the implement from the standard side power take-off of the tractor.

Referring to the drawings in detail, there is shown a conventional tractor 1 having the usual frame 2, and provided with a standard power take-off 3 at the side, and conventional power operated lifting arms 4 at the rear. The cultivator attachment 5 is shown secured to the side of the tractor frame, intermediate the tractor forward and rear wheels 6 and 7 and projecting at right angles to the frame.

The attachment consists of a cutting head 8, mounted in a telescopic main frame 9, a rocker arm frame 10, pivotally connected at its opposite ends to the main frame and to a mounting assembly 11, which, in turn, is connected to the tractor frame. The cutting head includes a shaft section 12 which is connected to a driving shaft 13 carried by the mounting assembly by means of a central telescopic shaft section 14, the connections between the shaft sections being through universal joints 15 and 16. Driving shaft 13 carries a pulley 17 which is driven by a belt 18 from the side power take-off 3 of the tractor.

The cutting head is made up of a plurality of tiller blades 19 mounted upon the shaft 12. This head is similar to those now in use for rotary hoeing and needs no detailed description. Shaft 12 is journalled on cross-arms 20 connecting the opposite ends of a pair of parallel tubes 21 forming part of the main frame. The tubes are closed at their outer ends, that is the ends farthest removed from the tractor, and contain coil springs 22 seated against the closed ends. Rods 23 fit telescopically within the open ends of tubes 21 and against the springs 22 and complete the main frame. The exposed ends of the rods are drilled to receive pins 24 to pivotally connect them to the end of the rocker arm frame. The outer end of the main frame is supported upon skids 25 which ride upon the ground, causing the cutting head to follow ground contour. The skids are connected by a bar 26 having upstanding mounting ears 27. Each ear has a vertical row of openings 28 to receive a bolt 29 to connect the skid assembly to brackets 30 on the outer cross-arm 20 of the main frame. The cutting depth of the tiller blades can be controlled by connecting the skids to the frame through the proper hole 28.

The rocker arm frame is connected to the main frame as described. It consists of a pair of spaced, parallel frame members 31 joined by bridge members 32, and serves to support the inner end of the cutting head from the tractor and permit the head to rise and fall and to assume any necessary angle in following ground contour. The opposite ends of the frame members 31 are pivotally connected to the mounting assembly 11.

The adjustable mounting assembly includes a pair of mounting plates 34 and 35 and a frame-supporting arm 36. While the plates 34 and 35 are shown as two separate members, it will be evident that they could be integral. The plates 34 and 35 are fixedly mounted on the tractor frame and the arm 36 is pivotally mounted on the plate 34 and held in positions of adjustment by means carried by the plate 35. The mounting plate 34 is riveted, or otherwise secured, to the side rail of the tractor frame, and has a stud 37 projecting outwardly from its front face. The frame-supporting arm 36 consists of a bar 38, to which the implement frame is attached by means of ears 39 on the bar and a pivot pin 40, and a mounting arm 41 integral with the bar and apertured at its outer end to seat upon the stud 37 on the mounting plate 34.

This arrangement will permit rocking movement of the frame-supporting bar 38 about the stud 37. Mounting plate 35 consists of a vertical extension 42, riveted or bolted to the tractor frame, and a horizontal bracket 43 which hangs below the tractor frame and behind the horizontal mounting bar 38 of the frame-supporting arm 36. A rearwardly projecting brace 44 may be connected to the underside of the tractor frame to give added rigidity to the horizontal bracket portion. The bracket 43 has ears 45 extending from the top and bottom edges of either end, and each of the ears is slotted, as shown at 46 in Figure 6. The ears at either end of the bracket are rather widely spaced apart, and each pair receives between them an ear 47 projecting from the frame-supporting arm 36. The ears 47 are also apertured as at 48, and pins 49 pass through the slots 46 and the apertures 48 to hold the members together. This particular arrangement will permit a limited amount of rocking movement of the frame-supporting arm about the stud 37 and, at the same time, will hold the frame-supporting arm against lateral movement.

The horizontal bracket 43 of the mounting plate 35 is provided with a forwardly-extending arm 50, and the bar portion 38 of the frame-supporting arm is provided with a rearwardly extending arm 51 to underlie the arm 50. Arm 50 has a threaded opening 52 and an adjusting screw 53 is threaded into it. The adjusting screw can be turned to bear upon the arm 51 to press the frame-supporting arm downwardly about the pivotal connection on the stud 37 and thus tighten the drive belt 18.

Through the pivotal connections of the main frame, rocker arm frame and mounting assembly to each other, the cutting head is free to move as ground contours dictate. The particular assembly, however, will maintain uniform tension on the drive belt irrespective of movement of the cutting head and associated parts.

Due to the telescopic arrangement of the main frame, the cutting head can be moved toward the tractor when desired. This movement is accomplished by means of a cable 56 connected to the inner cross-arm 20 of the main frame and to the power lift arm 4 of the tractor. As the power lift is at the rear of the tractor it is necessary to guide the cable by a series of pulleys. These include a pulley 57 mounted between arms 58 which are pivotally connected to the side frame members of the rocker arm frame 10. This pivotal mounting permits the pulley to move back and forth in alignment with the cultivator frame as will be described. The cable passes under pulley 57 and over a pulley 58 mounted between arm 60 attached to the bar 38 of the frame-supporting arm 36. The arms 60 are held against movement laterally of the tractor by a brace 61 connected to one of the arms 60 and by means of a pin 62 between ears 63 projecting from the mounting plate 34. This holds the pulley against movement away from the tractor but yet permits adjusting movement of the frame supporting arm 36 about the stud 37. The arms 60 are bridged by a bar 64, and a pulley 65 is mounted upon it at right angles to the pulley 59. The cable passes around and under pulley 59 and extends toward the rear of the tractor. Pulleys 66 and 67 suitably positioned in the tractor at the rear lead the cable to a position below, and in line with, the lifting arms.

It will be clear that when the arm 4 of the power lift is raised it will pull the cable, causing the tubular side members of the main frame to slide up on the frame rods 23 moving the cutting head closer to the tractor. When the arm 4 is lowered, springs 22 will force the main frame to extend to its former position. The use of the simple cable control from the rear power lift is possible only when the frame is biased to its outward, or extended, position. In this manner, the cutting head may be drawn in desired amount to clear trees, or other obstructions, and as soon as released it will return to its former path of movement. The telescoping shaft section 14 will shorten and lengthen in conformity with movement of the cutting head and maintain the driving connection.

When it is desired to transport the tractor from place to place or for some other reason to render the cutting head inoperative, the power lift is operated to a greater extent. When the main frame has moved inwardly to its limit of movement, or the springs 22 are compressed to the point where they overcome the weight of the main frame, continued movement of the cable will cause the frame to swing upwardly about its pivotal connection to the rocker arm frame to assume the position shown in dotted lines in Figure 1. At the time this is occurring, the pivoted arms 58 will permit pulley 57 to swing backwardly, seeking a medial position and thereby maintaining the proper angle of pull for the cable from the pulley to its attachment with the main frame. During the movement the rocker arm frame may also rise as all of the various pivoted elements will assume a neutral position under the pull of the cable. When the lifting arm 4 is lowered, the main frame will be lowered and then extend to its full outward position.

While in the above one practical embodiment of the invention has been disclosed, it will be understood that the details of construction shown and described are merely by way of example and the invention may take other forms within the scope of the appended claims.

What is claimed is:

1. A cultivator attachment for tractors having a power lift arm at the rear and a side power take-off comprising, a rotary ground-working implement, a telescopic main frame to support said implement, a rocker arm frame having one end pivotally connected to one end of the main frame to permit free relative vertical movement of the main and rocker arm frames, a frame supporting arm pivotally connected to the other end of the rocker arm frame to permit vertical pivotal movement of the rocker arm frame, a drive shaft section for the rotary implement journalled on the main frame, a drive shaft section journalled in said frame supporting arm, a telescopic drive shaft section intermediate the previously mentioned drive shaft sections and connected thereto by universal joints, a belt drive from the drive shaft section on the frame supporting arm to the tractor power take-off, a plate for rigid attachment to a tractor and having pivotal connection to the frame supporting arm so that the frame supporting arm can move vertically parallel to the path of travel of the tractor, means to limit the swinging movement of the frame supporting arm toward the power take-off, said frames connected to the frame supporting arm to extend at right angles to the path of tractor travel when the plate is connected to the tractor means to bias the telescopic main frame to extended position, and means to retract the telescopic main frame to draw the ground-working implement toward the tractor to which the attachment is connected.

2. In a cultivator attachment for a tractor as claimed in claim 1, said means to retract the main frame including a cable connected to the main frame and to the power lift arm of the tractor.

3. A cultivator attachment for tractors having a side power take-off comprising, a rotary ground-working implement, a main frame to support said implement, a rocker arm frame having one end pivotally connected to one end of the main frame to permit free relative vertical movement of the main and rocker arm frames, a mounting means pivotally connected to the other end of the rocker arm frame to permit vertical pivotal movement of the rocker arm frame, said mounting means being attachable to a tractor side with the frames extending at right angles to the direction of tractor travel, a drive shaft section for the rotary implement journalled on the main frame, a drive shaft section journalled in said mounting means, a drive shaft section intermediate the previously mentioned shaft sections and connected thereto by universal joints, and a belt drive from the drive shaft on the mounting means to the tractor power take-off, said mounting means including a plate for rigid connection to the tractor, a frame supporting arm carrying the pivotal connection between the mounting means and the rocker arm frame pivotally connected to the plate for movement in a vertical plane parallel to the direction of tractor travel to move the drive shaft section journalled therein toward and from the tractor take-off, and adjustable means to limit the swinging movement of the frame supporting arm toward the tractor power take-off.

References Cited in the file of this patent
UNITED STATES PATENTS

| | | |
|---|---|---|
| 2,489,633 | Fulghan | Nov. 29, 1949 |
| 2,601,380 | Flory | June 24, 1952 |
| 2,699,025 | Goss | Jan. 11, 1955 |
| 2,748,679 | Rogers | June 5, 1956 |
| 2,771,829 | Sahlbom | Nov. 27, 1956 |
| 2,882,978 | Smith et al. | Apr. 21, 1959 |